United States Patent
Noel, Jr.

[11] Patent Number: 5,375,339
[45] Date of Patent: Dec. 27, 1994

[54] ANCHOR BOLT HOLE LOCATOR

[76] Inventor: James A. Noel, Jr., 410 E. Lafayette St., Abbeville, La. 70510

[21] Appl. No.: 65,776

[22] Filed: May 24, 1993

[51] Int. Cl.$^5$ .......................... G01B 3/30; E04F 21/00
[52] U.S. Cl. ........................................ 33/518; 33/613
[58] Field of Search ................. 33/518, 481, 424, 485, 33/492, 526, 533, 645, 562, 563, 566; 52/105, 127.1, DIG. 1

[56] References Cited

U.S. PATENT DOCUMENTS

| | | | |
|---|---|---|---|
| 386,553 | 7/1888 | Morse | 33/526 |
| 2,760,272 | 8/1956 | Cantie | 33/518 |
| 3,327,395 | 6/1967 | Zenke | 33/518 |
| 4,361,964 | 12/1982 | Hennessee | 33/481 |
| 4,709,527 | 12/1987 | Cooley | 52/DIG. 1 |
| 5,068,976 | 12/1991 | Bell | 33/613 |
| 5,103,574 | 4/1992 | Levy | 33/613 |
| 5,203,090 | 4/1993 | Bouska et al. | 33/481 |
| 5,224,309 | 7/1993 | Bodell | 52/105 |

*Primary Examiner*—William A. Cuchlinski, Jr.
*Assistant Examiner*—Christopher W. Fulton
*Attorney, Agent, or Firm*—John D. Jeter

[57] ABSTRACT

A tool for locating a sole plate parallel to and a preselected distance from a foundation edge for marking locations for anchor stud bolt holes is then used for locating the holes in the sole plate to accept the studs set vertically in the foundation between the temporary location of the plate and the foundation edge. The tool is, preferably, made of a single plate shaped to have a rectangular rule port ion with a narrowed neck extending to a right angle bend to provide an index surface, with a wider hook head extending at a right angle from the index surface, away from and parallel to the hook portion. The hook head has arcuate notches on each side arranged such that the center of radius coincides with the plane of the index surface and a line extending along each edge of the rule portion. Alternatively, the neck is eliminated and the rule portion has two right angle bends to place a hook head in a plane parallel to the plane of the rule portion, the two planes separated about the dimension of a sole plate thickness with the arcuate notches opening toward the rule portion, the centers of radius coinciding with edge lines of the rule portion and a surface on the hook head serving as the index surface. In both options a bolt hole locator notch is situated in the edge of the rule portion to temporarily locate the sole plate from the edge of the foundation and then to locate the hole to be drilled when an arcuate notch engages a bolt while the tool is perpendicular to the sole plate. In use, the studs normally extend upward past the rule portion and are cleared by the narrow neck or equivalent clearance notches in the rule portion.

8 Claims, 2 Drawing Sheets

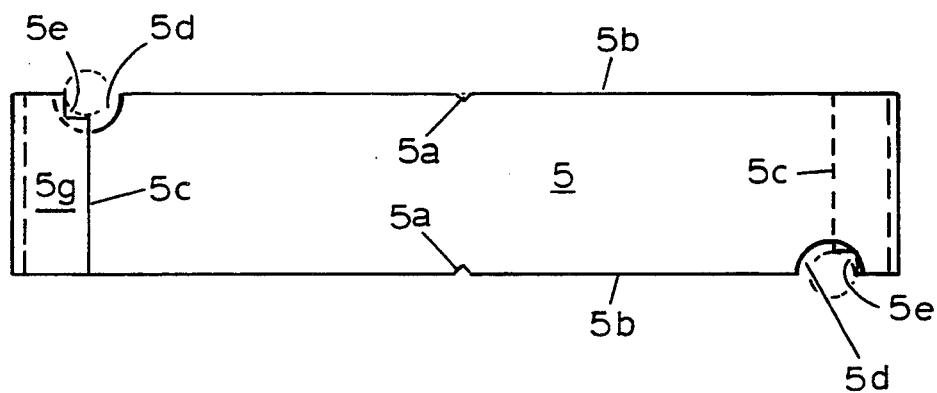
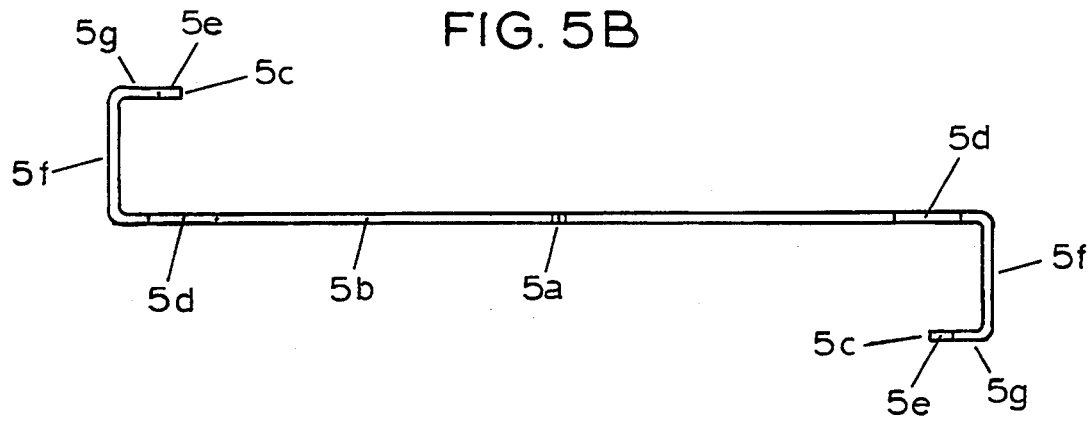

ANCHOR BOLT HOLE LOCATOR

This invention pertains to a tool for locating holes to be drilled in a sole plate to accept foundation anchor bolt studs projecting upward from a foundation.

Foundation bolt studs are set in foundation cement to protrude upward when the foundation hardens. The studs are, ideally, set in straight rows a given distance from a foundation edge with known spacing. A sole plate, usually a two-by-four or a two-by-six, is drilled to accept the studs and is laid on the foundation and anchored by washers and nuts on the studs.

As commonly practiced, the studs are not uniformly spaced from the foundation edge, not in a straight row, not evenly spaced, and often tilt from the vertical. Holes in the sole plate are then located by placing the sole plate near the row of studs, a measured distance from the foundation edge, and a hole for each stud is located by measuring, from the stud, a selected distance to the approximate center of the sole plate. To locate the holes correctly, laterally and longitudinally, on the sole plate takes considerable time and care.

A tool is needed that can be used like a hook rule with only one dimension indicator for locating the sole plate temporary marking position, with a near edge parallel to the edge of the foundation, and a stud engagement hook that will place the tool in position to use the same dimension indicator to mark the stud hole center line. Additionally, the tool should lay on top of the temporarily positioned sole plate and engage the stud near the foundation so that the stud, if straightened, will still align with the hole. It is an object of this invention to provide such a tool.

It is another object of this invention to provide a tool as described above that can be made from a single plate of material with only bends and notches.

It is another object of this invention to provide a tool as described above with locator features on both edges so that it can be used near obstructions on either side of the tool.

These and other objects, advantages, and features of this invention will be apparent to those skilled in the art from a consideration of this specification, including the attached claims and appended drawings.

SUMMARY OF THE INVENTION

A tool for locating holes in a sole plate for foundation studs has a straight portion to lay on top of the foundation, with a neck extending downward to engage the edge of the foundation like a hook rule. A locator notch in each edge defines a distance, parallel to the foundation edge, for the near edge of the sole plate placed temporarily near a row of studs. With the sole plate so placed, a hook on each side of the tool engages a stud at a point near the foundation, such that the center line of the stud is the same distance from the locator notch as is the hook used to locate the edge of the foundation. With the tool approximately transverse to the sole plate, the locator notch defines the hole center the same distance from the stud centerline as the sole plate near edge is from the foundation edge. Holes drilled as located will accept the studs when the sole plate is placed flush with the foundation edge.

The tool is, preferably, made from a single flat plate with a rectangular rule portion, a narrower neck, and a transverse hook head. The neck has a right angle bend to provide the foundation edge hook and a second right angle bend to place the hook head parallel to the rule portion but joggled downward a distance approximating the sole plate thickness so that the studs are engaged near the foundation. The hook head has hooks of arcuate shape opening toward the rule portion, one on each side, to align the center of arcs with the edges, of the rule portion. The narrow neck clears studs extending upward through the hooks. The hook arcuate centers are the same distance from the locator notch as the neck surface used to hook the foundation edge.

As an optional convenience, an additional locator notch is provided on each edge spaced farther from the hook for use on wider sole plates. The same locator notch is used for spacing the sole plate parallel to the foundation edge and for locating the holes from the hooked studs.

BRIEF DESCRIPTION OF DRAWINGS

In the drawings wherein like features have like captions,

FIGS. 5A and 5B are orthagonal views of an alternate embodiment of the tool of this invention.

DETAILED DESCRIPTION OF DRAWINGS

Figure 1A:
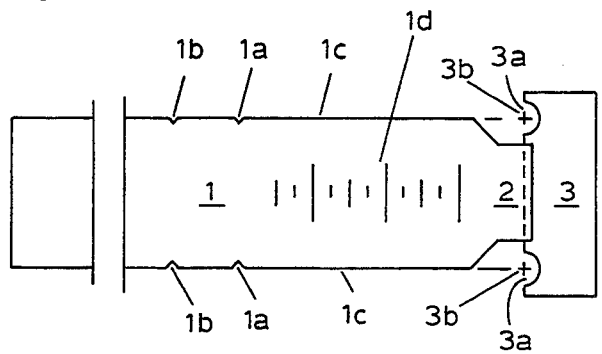
FIG. 1A is an elevation of the preferred embodiment of the invention.
Figure 1C:
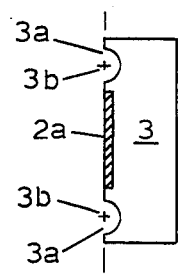
FIG. 1C is similar to FIG. 1A for a selected portion of the tool.
Figure 1B:
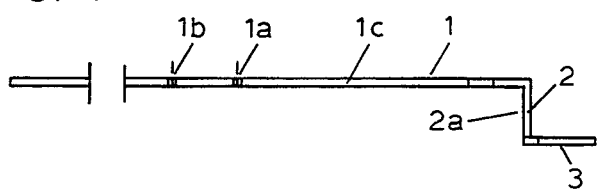
FIG. 1B is an orthagonal view of FIG. 1A.
Figure 1D:
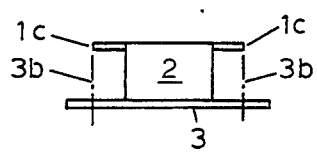
FIG. 1D is an end view of FIG. 1B.

In FIG. 1A, rule portion 1 is a rectangular plate joined to a transverse rectangular hook head 3 by narrower neck 2. Rule portion edges 1c have locator notches 1a and 1b. Arcuate notches 3a open toward the rule portion. The centers of arc 3b are on lines extending from edges 1c. FIG. 1B shows neck 2 joggled downward from the top of the rule portion to provide surface 2a perpendicular to the rule portion. This is a foundation edge locator surface. FIG. 1C shows the location of the centers 3b of arcuate notches 3a to lie in the same plane, perpendicular to the edges, as surface 2a. FIG. 1D shows that vertical studs, if in the arcuate notches (stud hooks), would clear the neck 2 and coincide with lines from edges 1c and surface 2a. Optional scale 1d would index from the edge locator surface.

Figure 2:
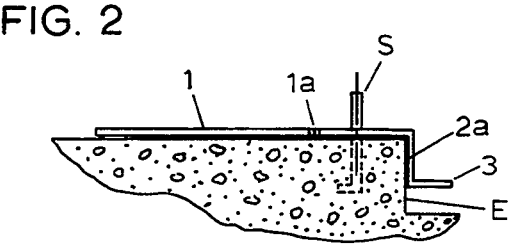
FIG. 2 is a side view of the tool of this invention, somewhat reduced in scale, in place on a foundation shown broken away.
Figure 3:
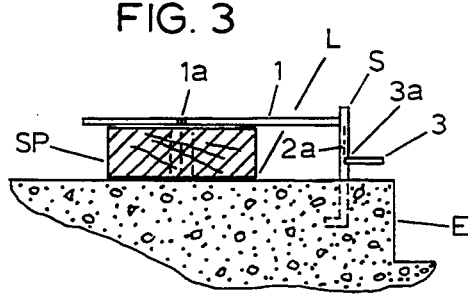
FIG. 3 is a side view of the tool of this invention, with a sole plate shown in the position for hole location.

FIG. 2 shows the tool laid on a foundation, near a stud S, with the foundation edge locator surface 2a used like a hook rule to place the locator notch 1a a distance from the edge E of the foundation for marking a line on which the near edge of the sole plate will be placed to mark the holes for the studs. FIG. 3 shows the sole plate SP in place on the foundation, near the edge on line L, with the tool rule portion 1 on top and extending, transverse to the sole plate, to place the stud hook 3a against stud S. Locator notch 1a indicates the point to mark for subsequent drilling of a stud hole.

Locator notches 1b are not shown in FIGS. 2 and 3. When wider sole plates are used, the studs are set farther from the foundation edge and locator notch 1b only will be used for locating the near edge line L and for locating holes for the studs.

Figure 4:
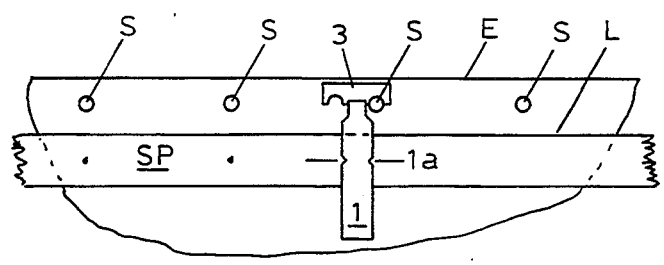
FIG. 4 is an elevation of the arrangement of FIG. 3, further reduced in scale.

FIG. 4 is on elevation, reduced in scale, showing a portion of a foundation with edge E parallel to a row of studs S. Sole plate SP is positioned on the foundation a distance from the edge having been defined by the distance between the foundation edge locator surface 2a and locator notch 1a. The tool is in place on top of and transverse to the sole plate. The stud hook has engaged a stud S and a locator mark may be placed at notch 1a.

FIGS. 5A and 5B represent an alternate embodiment of the tool. The tool is designed to be inverted and the ends switched when space limitations require location of a stud from the opposite side of the tool. Rule portion 5 has edges 5b ending at clearance notches 5d. At each end the bends are made to provide neck 5f to position stud locator head 5g some distance from the rule portion. Head 5g has foundation edge locator surface 5c. Each locator notch 5a is equal distance from surface 5c. Stud locator notch 5e is so located that a stud of given size, engaging the notch as shown by dotted lines, will have a center line aligned with surface 5c and with edge 5b.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth shown or in the accompanying drawings is to be interpreted as illustrative and not in a limiting sense.

The invention having been described, I claim:

1. A tool for determining the distance from a foundation edge for temporarily placing a sole plate and for use to locate holes to be drilled in the sole plate, so positioned, to accept foundation anchor bolt studs protruding upward from the foundation between the positioned sole plate and the foundation edge, the tool comprising:
   a) a rectangular rule portion having a width defined by two parallel edges, and a first end;
   b) a hook head joined to said rule portion by a neck arranged to place said hook head a distance from a plane containing said parallel edges, and a first preselected distance from said first end;
   c) a foundation edge locator surface, attached to said rule portion, and spaced from said plane;
   d) two separated stud hook notches in said hook head, opening toward said rule portion, said notches each located such that a stud of a preselected diameter, in said notch, with a centerline extending perpendicular to said plane will position said centerline to intersect a line extending from one of said edges, both said centerlines to lie in a second plane perpendicular to said edges and containing said surface; and
   e) a locator notch in each said edge a second preselected distance from said surface.

2. The tool of claim 1 wherein a second locator notch is situated in each said edge a greater distance from said surface than said second preselected distance.

3. The tool of claim 1 wherein said surface is situated on said neck.

4. The tool of claim 1 wherein said surface is located on said hook head.

5. The tool of claim 1 wherein clearance is provided to clear said studs, in said stud hook notches, that extend past said plane.

6. The tool of claim 1 wherein said tool comprises a single flat plate, cutaway to provide a narrow portion for said neck, said neck bent to provide said foundation edge locator surface, and to position said hook head.

7. A tool for determining the distance from a foundation edge for temporarily placing a sole plate and for use to locate holes to be drilled in the sole plate, so positioned, to accept foundation anchor bolt studs protruding upward front the foundation between the positioned sole plate and the foundation edge, the tool comprising:
   a) rule portion having a plane surface and a straight edge, said edge having a first end;
   b) a stud locator head;
   c) attachment means to secure said head a first preselected distance from a plane containing said plane surface, and a second preselected distance from said first end;
   d) an edge locator surface attached to said rule portion positioned a third preselected distance from said plane and situated between said first end and said head;
   e) a stud locator notch in said head, situated such that a stud of preselected diameter, and engaging said notch, extending perpendicular to said plane, will have a centerline intersecting a line extending from said edge, a second plane, perpendicular to said line, to contain said centerline and said edge locator surface; and
   f) a locator notch in said edge, a fourth preselected distance from said second plane.

8. The tool of claim 1 wherein at least one side of said rule portion has linear dimension markings extending parallel to said edges.

* * * * *